US011261330B2

(12) United States Patent
Rämö et al.

(10) Patent No.: US 11,261,330 B2
(45) Date of Patent: Mar. 1, 2022

(54) COMPOSITION COMPRISING PARAFFINS AND METHOD FOR PRODUCING THE SAME

(71) Applicant: Neste Corporation, Espoo (FI)

(72) Inventors: Virpi Rämö, Porvoo (FI); Tomi Nyman, Vantaa (FI); Tanja Eskola, Helsinki (FI)

(73) Assignee: NESTE CORPORATION, Espoo (FI)

( * ) Notice: Subject to any disclaimer, the term of this patent is extended or adjusted under 35 U.S.C. 154(b) by 639 days.

(21) Appl. No.: 16/350,487

(22) PCT Filed: May 16, 2017

(86) PCT No.: PCT/FI2017/050374
§ 371 (c)(1),
(2) Date: Nov. 19, 2018

(87) PCT Pub. No.: WO2017/198905
PCT Pub. Date: Nov. 23, 2017

(65) Prior Publication Data
US 2020/0263034 A1    Aug. 20, 2020

(30) Foreign Application Priority Data

May 17, 2016 (FI) .................................... 20165414

(51) Int. Cl.
*C08L 91/00* (2006.01)
*C09D 7/20* (2018.01)
(Continued)

(52) U.S. Cl.
CPC ............... *C08L 91/00* (2013.01); *C09D 7/20* (2018.01); *C09D 191/00* (2013.01); *C10G 45/02* (2013.01);
(Continued)

(58) Field of Classification Search
CPC ....... C08L 91/00; C09D 191/00; C10G 45/02; C10G 69/02; C10G 2300/1014; C10G 2300/1018
(Continued)

(56) References Cited

U.S. PATENT DOCUMENTS

| 4,992,605 A | 2/1991 | Craig et al. |
| 2006/0135366 A1 | 6/2006 | Glassel et al. |

(Continued)

FOREIGN PATENT DOCUMENTS

| EP | 2368967 A1 | 9/2011 |
| EP | 3095844 A1 | 11/2016 |

(Continued)

OTHER PUBLICATIONS

Search Report issued in corresponding Finnish Patent Application No. 20165414, 2 pages, Aug. 30, 2016.
(Continued)

*Primary Examiner* — Ellen M McAvoy
(74) *Attorney, Agent, or Firm* — Buchanan Ingersoll & Rooney PC

(57) ABSTRACT

The invention relates to a composition comprising C10-C20 paraffins, wherein about 3 wt. % to about 30 wt. %, based on the total weight of the composition, are C10-C15 paraffins, and the C10-C20 paraffins are derived from a biological raw material. The invention also relates to a protective agent for a porous material, comprising said composition.

23 Claims, 2 Drawing Sheets

(51) Int. Cl.
*C09D 191/00* (2006.01)
*C10G 45/02* (2006.01)
*C10G 69/02* (2006.01)

(52) U.S. Cl.
CPC ..... *C10G 69/02* (2013.01); *C10G 2300/1014* (2013.01); *C10G 2300/1018* (2013.01); *C10G 2300/202* (2013.01); *C10G 2300/301* (2013.01); *C10G 2300/302* (2013.01); *C10G 2300/304* (2013.01)

(58) Field of Classification Search
USPC ..................................................... 585/1, 240
See application file for complete search history.

(56) References Cited

U.S. PATENT DOCUMENTS

| | | | |
|---|---|---|---|
| 2009/0300971 A1* | 12/2009 | Abhari ........... | C07C 5/22 44/308 |
| 2010/0043279 A1 | 2/2010 | Abhari et al. | |
| 2011/0087058 A1* | 4/2011 | Harlin ........... | B01J 31/20 585/240 |
| 2012/0157728 A1* | 6/2012 | Vermeiren ..... | C11B 13/02 585/240 |
| 2014/0303057 A1* | 10/2014 | Abhari ........... | A01N 25/02 508/589 |
| 2016/0046541 A1* | 2/2016 | Kelkar .......... | B01J 23/8892 585/733 |
| 2016/0068453 A1* | 3/2016 | Fichtl ........... | C07C 9/15 585/323 |
| 2017/0313922 A1* | 11/2017 | Bardin ........... | C04B 40/0039 |
| 2018/0148656 A1* | 5/2018 | Germanaud ..... | C10G 45/44 |
| 2018/0155636 A1* | 6/2018 | Germanaud ..... | C10G 45/58 |
| 2018/0179458 A1* | 6/2018 | Hakola ........... | C10G 69/126 |
| 2019/0060192 A1* | 2/2019 | Swoboda ........ | A61P 17/00 |

FOREIGN PATENT DOCUMENTS

| | | |
|---|---|---|
| WO | 2008093990 A1 | 8/2008 |
| WO | 2010068904 A2 | 6/2010 |
| WO | 2013123678 A1 | 8/2013 |
| WO | 2015101837 A2 | 7/2015 |

OTHER PUBLICATIONS

International Search Report and Written Opinion issued in corresponding International Patent Application No. PCT/FI2017/050374, 12 pages, Aug. 23, 2017.

Cannella et al., Advanced Alternative and Renewable Diesel Fuels: Detailed Characterization of Physical and Chemical Properties; Coordinating Research Council, Inc., CRC Report No. AVFL-19-2, Alpharetta, Georgia, USA, 280 pages, Apr. 1, 2013.

Unknown, "nParaffins (Complex Normal Paraffin)," ChemicalLand21, https://web.archive.org/web/20060411075036/http://www.chemicalland21.com/petrochemical/nPARAFFINS.Htm, Aug. 24, 2016, 2 pages./.

\* cited by examiner 1         2

1         2

COMPOSITION COMPRISING PARAFFINS AND METHOD FOR PRODUCING THE SAME

FIELD OF THE INVENTION

The present invention relates to a composition comprising paraffin fractions, and a method for producing the same. The composition is suitable for protection of various porous materials.

BACKGROUND OF THE INVENTION

WO 2015/101837 A2 discloses a composition comprising 40-50 wt. % C14 paraffins and 35-45 wt. % C15 paraffins, based on the total weight of the composition, wherein said paraffins are produced from a biological raw material. The composition can be used as a wood treatment composition, among others.

BRIEF DESCRIPTION OF THE INVENTION

An object of the present invention is to provide a composition comprising C10-C20 paraffins, wherein about 3 wt. % to about 30 wt. %, based on the total weight of the composition, are C10-C15 paraffins, and the C10-C20 paraffins are derived from a biological raw material.

Another object of the invention is to provide a method for producing a composition of the invention, comprising the steps of:

hydrodeoxygenation and optional isomerization of a biological raw material to produce a hydrocarbon fraction with a chain length in the range of C10-C20.

A further object of the invention is to provide a protective agent for a porous material, comprising a composition of the invention or that prepared by the method of the invention.

A still further object of the invention is to provide use of a composition of the invention or a protective agent of the invention for treating a porous material.

It was found in the present invention that a superior penetration of a composition comprising paraffins with a chain length in the range of C10 to C20 into a porous material, such as wood, is achieved. Penetration depth, or impregnation depth, is an important property in protective treatments of porous materials, such as various wood articles. Without being bound by any theory, it is assumed that a superior penetration ability of the composition results from a favorable ratio of short chain and long chain hydrocarbons. It is believed that isomerization of the hydrocarbons further enhances the wetting and thereby the penetration of the composition into porous substrates.

DETAILED DESCRIPTION OF THE INVENTION

Figure 1:
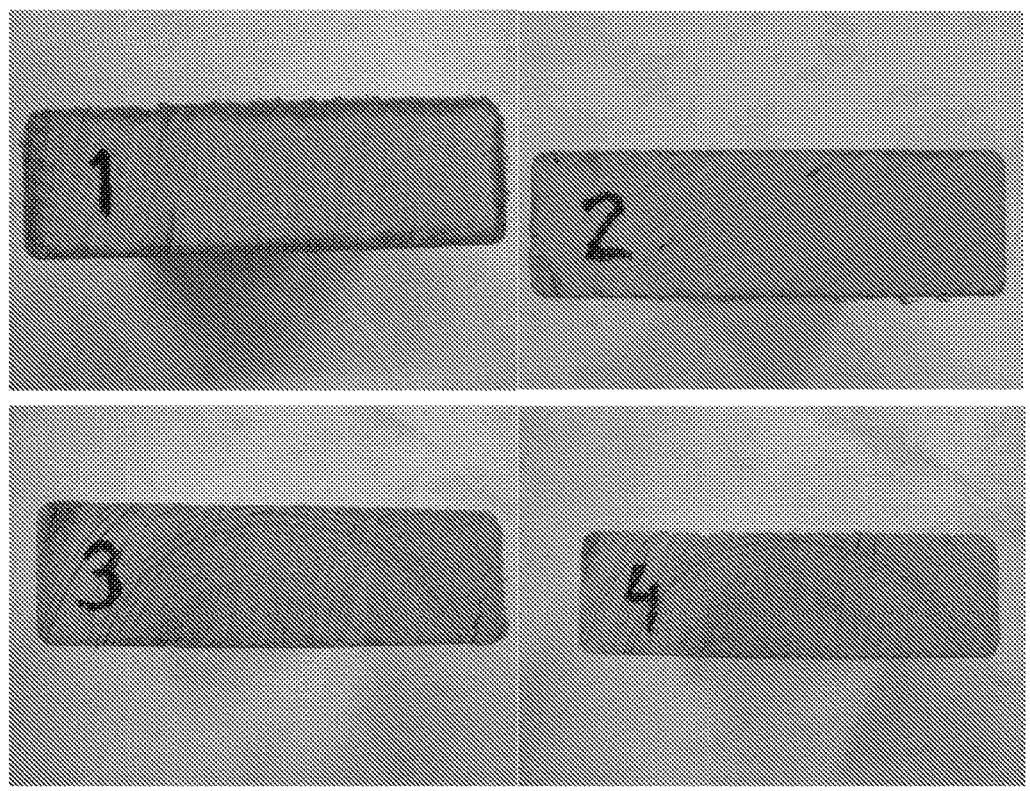
FIG. 1 shows an impregnation ability of a composition of the present invention and that of commercial dearomatised fossil solvent NESSOL LIAV 200 into wood material.

The present invention provides a composition comprising C10-C20 paraffins, wherein about 3 wt. % to about 30 wt. %, based on the total weight of the composition, are C10-C15 paraffins, and the C10-C20 paraffins are derived from a biological raw material.

In an embodiment of the invention, the amount of C10-C15 paraffins, based on the total weight of the composition, is 10 wt. % to about 30 wt. %. In another embodiment, the amount of C10-C15 paraffins, based on the total weight of the composition, is 10 wt. % to about 20 wt. %.

In an embodiment, the composition comprises about 70 wt. % to about 97 wt. % of C16-C20 paraffins, based on the total weight of the composition. In another embodiment, the composition comprises about 70 wt. % to about 90 wt. % of C16-C20 paraffins.

In an embodiment, the composition comprises 100% C10-C20 paraffins, based on the total weight of the composition. In another embodiment, the composition comprises at most 4 wt. % of smaller than C10 paraffins. In a further embodiment, the composition comprises at most 1% wt. % of larger than C20 paraffins. In a still further embodiment, the composition comprises at most 4 wt. % of smaller than C10 paraffins and at most 1% wt. % of larger than C20 paraffins.

In an embodiment, the total amount of isoparaffins in the composition is at least about 1 wt. %. In another embodiment, the total amount of isoparaffins is at least about 50 wt. %. In a further embodiment, the total amount of isoparaffins is at least about 70 wt. %. In a still further embodiment, the total amount of isoparaffins is at least about 90 wt. %.

The boiling point of the composition is in the range of about 180° C. to about 330° C.

The total amount of the aromatics in the composition is less than about 1.1 wt. % based on the total weight of the composition. The content of aromatics is determined according to EN 12916.

The composition of the invention has typically a kinematic viscosity in the range of 2.5 mm$^2$/s to 5 mm$^2$/s at 40° C. (EN ISO 3104).

Flash point of the composition of the invention can be in the range of 60° C.-150° C. (EN ISO 2719).

Pour point of the composition of the invention can be in the range of −80° C. to 30° C. (ASTMD5950).

Surface tension of the composition of the invention is typically in the range of 25-29 mN/m (ASTMD971M).

According to Paint directive (2004/42/EC) and European EcoLabelling scheme (2002/739/EC amending 1999/10/EC) for paints and varnishes VOC is an organic compound having an initial boiling point lower than or equal to 250° C. at an atmospheric pressure of 101.3 kPa. In an embodiment of the present invention, the composition contains compounds having a boiling point below 250° in an amount of less than 15 wt. %.

The C10-C20 paraffins are derived from a biological raw material. The biological raw material can be originated from plants or animals. The material can be selected from vegetable oils, animal fats, fish oils and mixtures thereof. Examples of suitable biological raw materials include, but are not limited to, rapeseed oil, canola oil, colza oil, tall oil, sunflower oil, soybean oil, hemp oil, olive oil, linseed oil, mustard oil, palm oil, arachis oil, castor oil, coconut oil, animal fats such as suet, tallow, blubber, recycled alimentary fats, starting materials produced by genetic engineering, and biological starting materials produced by microbes such as algae and bacteria. Further condensation products, esters, or other derivates obtained from biological raw materials may also be used as starting materials. Also recycled raw materials of biological origin are suitable.

In an aspect, the invention provides a method for producing of the composition described above, comprising the steps of:

hydrodeoxygenation and optional isomerization of a biological raw material to produce a hydrocarbon fraction with a chain length in the range of C10-C20.

Reaction conditions and catalysts typically used in the hydrodeoxygenation of a biological material and in the optional isomerization of resultant n-paraffins are well known techniques to a skilled person in the art. These steps are described in more detail, e.g., in WO 2015/101837 A2.

In an embodiment, the method of the invention does not involve a distillation step in order to provide a composition having a boiling range from about 180° C. to about 330° C.

The composition of the invention has a superior penetration ability throughout a porous material and is suitable for a protective treatment of a porous material. The composition of the invention can be used as such as a protective agent, or formulated into formulation with further component(s) to provide a protect agent. An object of the invention is thus to provide a protective agent comprising the composition of the invention or that prepared by the method of the invention. The protective agent can further contain, e.g., colorant(s), pigment(s), antioxidant(s). An advantage of the protective agent of the invention is that a superior penetration ability and protective coating are achieved with a single component instead of a formulation containing a solvent and oil. In the present invention, there is no need for a low boiling range solvent to enhance the penetration of the composition into a porous material. In an embodiment, the protective agent is free of a solvent boiling in the range of 159° C. to 169° C.

When applied to a porous material, the composition or the protective agent forms a water repellent, breathable layer on the surface of the material. An object of the present invention is thus to provide use of the composition of the invention or the protective agent of the invention for treating a porous material.

The porous material can be any material which enables the composition to be penetrated into the material to at least some extent. Examples of the porous materials include, but are not limited to, wood, ceramics, brickstone, leather, cement, composite materials, concrete, plywood, paper, board and textile.

Impregnation Ability of the Composition

Figure 2A:
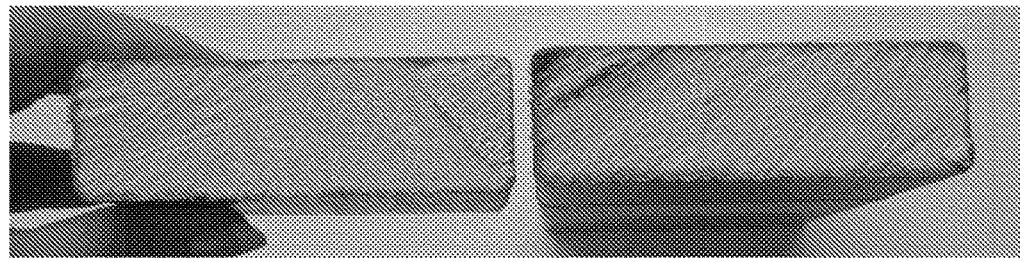
FIGS. 2a and 2b show an impregnation ability of a composition of the present invention and that of commercial wood protective agent "Supi Saunasuoja" into wood material.
Figure 2B:
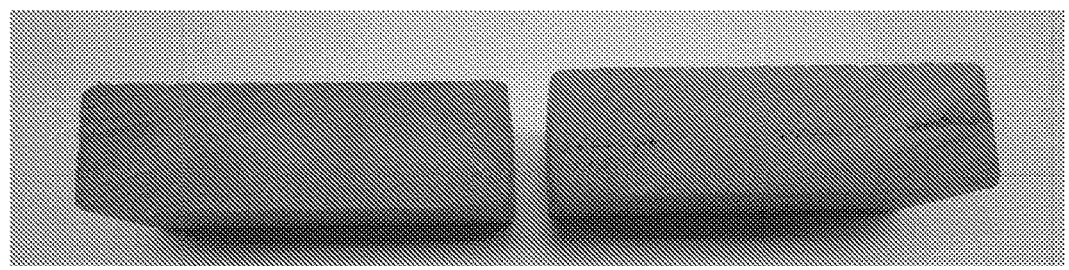

The superior penetration ability of a composition of the invention into wood matrices is illustrated in FIGS. 1, 2a and 2b. The composition tested contained 17.3 wt. % of C10-C15 paraffins, of which 89 wt. % were isoparaffins, and 80.3 wt. % C16-C20 paraffins, of which 95 wt. % were isoparaffins. The amount of isoparaffins in the composition was >93 wt. % of the total C10-C20 paraffins. The composition had a boiling range from about 180° C. to about 330° C., kinetic viscosity of 2.9 mm²/s at 40° C. (EN ISO 3104), flash point of >60° C. (EN ISO 2719), pour point of <−40° C., and surface tension of 27 mN/m (ASTMD971M).

In all tests, the above composition was applied twice on a surface of aspen plank and a spruce plank. The second treatment was performed 4 hours after the first spreading. 30 minutes after the second treatment, excess of the composition was wiped off from the surface. The treated samples were let dry for 24 hours. A cross section was cut from dry samples to reveal the penetration depth of the composition in the wood planks.

As a reference, a commercial product "NESSOL LIAV 200" (Neste Oy) which is typically used as a solvent component in wood oil products. The boiling range of this solvent is in the range of 159° C. to 169° C. As another reference, a commercial product "Supi Saunasuoja" (Tikkurila Oy) targeted to wood material protection in saunas was used. The aspen and spruce planks were treated with said reference products similarly as with the composition of the invention. The impregnation depth in z-direction was visually examined from a cross-cut sample surface right after cutting to reveal the impregnation depth, and a month after cutting to reveal the spreading on the surface. To ease the visual inspection 0.5% of REDMCNY25 (red) was added to each composition to be tested.

FIG. 1 shows the results achieved with a composition of the invention and NESSOL LIAV 200 directly after cutting the planks. The results show visible differences in the impregnation depth of the tested samples. Samples 1 and 3 are an aspen plank and a spruce plank, respectively, and treated with a composition of the invention. Samples 2 and 4 are an aspen plank and a spruce plank, respectively, and treated with NESSOL LIAV 200. The composition of the invention has effectively impregnated into aspen and spruce planks. In case of NESSOL LIAV 200, impregnation has been more limited for both substrates (samples 2 and 4). It can be concluded that for NESSOL LIAV 200, the time to impregnate before it evaporates is limited.

FIGS. 2a and 2b show the impregnation depth into an aspen plank achieved with a composition of the invention and Supi Saunasuoja. In FIGS. 2a and 2b, sample 1 describes Supi Saunasuoja, and sample 2 describes a composition of the invention. FIG. 2a shows the impregnation depth immediately after cutting the aspen planks. It can be seen that sample 2 penetrated deeper in the aspen plank. FIG. 2b shows the impregnation depth after one month. Sample 2 is evenly distributed across the whole cross cut of the plank while some untreated areas are can still be seen in the middle of the plank.

It will be obvious to a person skilled in the art that, as the technology advances, the inventive concept can be implemented in various ways. The invention and its embodiments are not limited to the examples described above but may vary within the scope of the claims.

The invention claimed is:

1. A composition comprising:
   each of C10-C20 paraffins, wherein about 3 wt. % to about 30 wt. % are C10-C15 paraffins, and about 70 wt. % to about 97 wt. % are C16-C20 paraffins, based on a total weight of the composition, a total amount of isoparaffins in the composition is at least about 50 wt. %, and the C10-C20 paraffins are derived from a biological raw material.

2. The composition of claim 1, wherein the biological raw material is at least one raw material selected from the group consisting of rapeseed oil, canola oil, colza oil, tall oil, sunflower oil, soybean oil, hemp oil, olive oil, linseed oil, mustard oil, palm oil, arachis oil, castor oil, coconut oil, animal fats, materials produced by genetic engineering, and biological starting materials produced by microbes, algae, or bacteria.

3. The composition of claim 1, wherein the composition comprises: about 10 wt. % to about 30 wt. % of C10-C15 paraffins.

4. The composition of claim 3, wherein the composition comprises: about 10 wt. % to about 20 wt. % of C10-C15 paraffins.

5. The composition of claim 1, wherein the composition comprises: about 70 wt. % to about 90 wt. % of C16-C20 paraffins, based on the total weight of the composition.

6. The composition of claim 1, comprising:
100% C10-C20 paraffins, based on the total weight of the composition.

7. The composition of claim 1, comprising:
at most 4 wt. % of smaller than C10 paraffins and/or at most 1% wt. % of larger than C20 paraffins.

8. The composition of claim 1, wherein the total amount of isoparaffins in the composition is at least about 70 wt. %.

9. The composition of claim 1, wherein a boiling point of the composition is in a range of about 180° C. to about 330° C.

10. The composition of claim 1, wherein a total aromatic hydrocarbon content of the composition is less than about 1.1 wt. % determined according to EN 12916.

11. The composition of claim 1, wherein the composition comprising:
compounds having a boiling point below 250° in an amount of less than 15 wt. %.

12. The composition of claim 1, wherein the composition has a kinematic viscosity in a range of 2.5 mm²/s to 5 mm²/s at 40° C. (EN ISO 3104).

13. The composition of claim 1, wherein the composition has a flash point in a range of 60° C.-150° C. (EN ISO 2719).

14. The composition of claim 1, wherein the composition has a pour point in a range of −80° C. to 30° C. (ASTMD5950).

15. The composition of claim 1, wherein the composition has a surface tension in a range of 25-29 mN/m (ASTMD971M).

16. A method for producing a composition having C10-C20 paraffins, wherein about 3 wt. % to about 30 wt. %, based on a total weight of the composition, are C10-C15 paraffins, and the C10-C20 paraffins are derived from a biological raw material, the method, comprising:
hydrodeoxygenation and optional isomerization of the biological raw material to produce a hydrocarbon fraction with a chain length in the range of C10-C20.

17. The method of claim 16, wherein the method does not involve distillation.

18. A protective agent for a porous material, comprising:
a composition of C10-C20 paraffins, wherein about 3 wt. % to about 30 wt. %, based on a total weight of the composition, are C10-C15 paraffins, and the C10-C20 paraffins are derived from a biological raw material.

19. The protective agent of claim 18, which is free of a solvent boiling in a range of 159° C. to 169° C.

20. A method comprising;
providing a composition of C10-C20 paraffins, wherein about 3 wt. % to about 30 wt. %, based on a total weight of the composition, are C10-C15 paraffins, and the C10-C20 paraffins are derived from a biological raw material; and
applying the composition to a porous material.

21. The method of claim 20, wherein the porous material is selected from the group consisting of wood, ceramics, brickstone, leather, cement, composite materials, concrete, plywood, paper, board and textile.

22. A protective agent for a porous material, the protective agent being produced by the method according to claim 16.

23. The composition of claim 1, wherein the total amount of isoparaffins in the composition is at least about 90 wt. %.

* * * * *